United States Patent [19]
Sakamoto

[11] Patent Number: 5,371,612
[45] Date of Patent: Dec. 6, 1994

[54] METHOD OF AND APPARATUS FOR FORMING HALFTONE IMAGES

[75] Inventor: Takashi Sakamoto, Tenjinkitamachi, Japan

[73] Assignee: Dainippon Screen Mfg. Co., Ltd., Kyoto, Japan

[21] Appl. No.: 133,236

[22] Filed: Oct. 7, 1993

[30] Foreign Application Priority Data

Oct. 21, 1992 [JP] Japan .................. 4-308255

[51] Int. Cl.$^5$ .............................................. H04N 1/40
[52] U.S. Cl. .................... 358/456; 358/459; 358/298
[58] Field of Search ............... 358/456, 533, 534, 535, 358/536, 457, 459, 298

[56] References Cited

FOREIGN PATENT DOCUMENTS 60-41343 9/1985 Japan .................. G03F 5/00

Primary Examiner—Edward L. Coles, Sr.
Assistant Examiner—Madeleine Anh-Vinh Nguyen
Attorney, Agent, or Firm—Lowe, Price, LeBlanc & Becker

[57] ABSTRACT

Screen angles $\theta 1$, $\theta 2$ and $\theta 3$ of first through the third halftone images, which are strongly related to the generation of moire, are determined by setting values of integers m1, n1, m2, n2, m3 and n3 which defines the screen angles by $\tan\theta 1 = n1/m1$, $\tan\theta 2 = n2/m2$, $\tan\theta 3 = n3/m3$. Suppose that first through third square areas for the first through third halftone dots have side lengths of L1, L2 and L3, which are integers, the first through third square areas includes $(m1^2 + n1^2)$, $(m2^2 + n2^2)$, and $(m3^2 + n3^2)$ pieces of halftone dots, respectively. The values of the integers is determined to satisfy: $m1/L1 - m2/L2 = n3/L3$; and $-n1/L1 + n2/L2 = m3/L3$.

7 Claims, 8 Drawing Sheets

Fig. 5

| | FIRST COLOR (MAGENTA) | | | | | SECOND COLOR (CYAN) | | | | | THIRD COLOR (BLACK) | | | | |
|---|---|---|---|---|---|---|---|---|---|---|---|---|---|---|---|
| | m1 | n1 | L1 | P1 | θ1 | m2 | n2 | L2 | P2 | θ2 | m3 | n3 | L3 | P3 | θ3 |
| EXAMPLE 1 | 2 | 1 | 35 | 15.65 | 26.6° | 1 | 8 | 130 | 16.12 | 82.9° | 6 | 9 | 182 | 16.83 | 56.3° |
| EXAMPLE 2 | 2 | 1 | 30 | 13.42 | 26.6° | 1 | 7 | 100 | 14.14 | 81.9° | 11 | 17 | 300 | 14.82 | 57.1° |
| EXAMPLE 3 | 3 | 1 | 50 | 15.81 | 18.4° | 1 | 8 | 130 | 16.12 | 82.9° | 27 | 35 | 650 | 14.97 | 52.4° |
| EXAMPLE 4 | 3 | 1 | 50 | 15.81 | 18.4° | 1 | 7 | 100 | 14.14 | 81.9° | 5 | 5 | 100 | 14.14 | 45.0° |
| EXAMPLE 5 | 5 | 2 | 80 | 14.86 | 21.8° | 1 | 7 | 100 | 14.14 | 81.9° | 18 | 21 | 400 | 14.46 | 49.4° |
| EXAMPLE 6 | 7 | 4 | 130 | 16.12 | 29.7° | 1 | 8 | 130 | 16.12 | 82.9° | 2 | 3 | 65 | 18.03 | 56.3° |
| EXAMPLE 7 | 17 | 7 | 416 | 22.63 | 23.3° | 1 | 7 | 160 | 22.63 | 81.9° | 7 | 9 | 260 | 22.80 | 52.1° |

$\theta = 0°$ $\theta = 45°$

METHOD OF AND APPARATUS FOR FORMING HALFTONE IMAGES

BACKGROUND OF THE INVENTION

1. Industrial Field of the Invention

The present invention relates to a method of and an apparatus for forming a plurality of halftone images to reproduce a color image, and more particularly, it relates to a technique to restrain moire.

2. Description of the Related Art

Color prints are usually formed by printing four halftone images with respective four primary color inks of yellow (Y), magenta (M), cyan (C) and black (K), one over another. In printing a plurality of halftone images in such a way, the screen angles, or directions in which halftone dots are arranged, are adjusted to prevent moire. For example, when the screen angle of Y plate is set at 0°, that of M plate is set at 15°, C. plate at 75°, and K plate at 45°. Among the four primary colors, the cyan, magenta and black are strongly related to moire generation because they are deep colors. In the above example of the screen angles, moire generation is restrained by retaining a difference of 30° among the three deep colors.

While tangent 0° and tangent 45° are rational numbers, tangent 15° and tangent 75° are irrational numbers. The halftone-dot formation method which includes a screen angle whose tangent is an irrational number is called Irrational Tangent Method. On the other hand, the halftone-dot formation method in which the tangents of all the screen angles are rational numbers is called Rational Tangent Method. Although the Irrational Tangent Method has been dominant in the past, the Rational Tangent Method is becoming popular these days along with the development of computer technology. This is because the Rational Tangent Method is more suitable to computer processing because a certain square area, which involves a plurality of halftone dots, is repeatedly laid out on an image plane to decide the shape and size of halftone dots.

Since the tangent of screen angles are limited to the rational number in the Rational Tangent Method, it is impossible to set the screen angles for the four primary colors to 0°, 15°, 75° and 45° as in the above example; therefore, it is usual to set the values close to them. However, it is a fairly difficult operation to set the screen angles and the screen pitch for each halftone image so as to restrain moire because the screen pitch, or a pitch of halftone dots, of each halftone image is also related to moire generation.

A method of restraining moire for the rational Tangent Method is described in Japanese Patent Publication Gazette 60-41343. The method is, however, adoptable under limited conditions only, and it is sometimes difficult to implement.

SUMMARY OF THE INVENTION

An object of the present invention is to provide a flexible method to restrain moire in the Rational Tangent Method.

The present invention is directed to a method of forming a plurality of halftone images to be used in reproducing a color image, comprising the step of: determining screen angles $\theta_1$, $\theta_2$ and $\theta_3$ of first through third halftone images, respectively, by setting values of integers m1, n1, m2, n2, m3 and n3 defining relations of $\tan\theta_1 = n1/m1$, $\tan\theta_2 = n2/m2$, and $\tan\theta_3 = n3/m3$ while satisfying Equations (Eq1) and (Eq2):

$$\frac{m1}{L1} - \frac{m2}{L2} = \frac{n3}{L3}; \quad \text{(Eq1)}$$

and $$-\frac{n1}{L1} + \frac{n2}{L2} = \frac{m3}{L3}; \quad \text{(Eq2)}$$

where L1, L2 and L3 are integers indicating side lengths of first through third square areas for the first through the third halftone images, respectively, the first through third square areas including $(m1^2+n1^2)$ pieces of halftone dots, $(m2^2+n2^2)$ pieces of halftone dots, and $(m3^2+n3^2)$ pieces of halftone dots, respectively.

In a preferred embodiment, each of the integers n1, n2 and n3 is not equal to zero, the integers satisfies that $m1 \neq n1$, $m2 \neq n2$, and $m3 \neq n3$.

Preferably, the first halftone images are those for magenta, cyan, and black inks, respectively.

According to an aspect of the present invention, the method further comprises the steps of: preparing first through third sets of threshold values for the first through third halftone images, respectively, the first through third sets of threshold values being assigned to pixels within the first through third square areas, respectively, the first through third square areas being laid out repeatedly on respective image planes corresponding to the respective first through third halftone images; comparing first through third color separation image signals representing a color image with the first through third sets of threshold values, respectively, to thereby produce first through third exposure signals; and forming the first through third halftone images as a function of the first through third exposure signals, respectively.

The present invention is also directed to apparatus of forming a plurality of halftone images to be used in reproducing a color image, comprising: (a) image capturing means for capturing first through third color separation image signals representing a color image for first through third colors, respectively; (b) a mount for mounting photosensitive material, on which first through third halftone images are to be recorded; (c) a screen pattern memory for storing three sets of threshold values for the respective first through third colors, the three sets of threshold values being arranged in first through third square areas, respectively, each of the first through third square areas being laid out repeatedly in an X–Y coordinate system, each of the first through third square areas being defined by: (c-1) determining screen angles $\theta_1$, $\theta_2$ and $\theta_3$ of the first through third halftone images, respectively, by setting values of integers m1, n1, m2, n2, m3 and n3 defining relations of $\tan\theta_1 = n1/m1$, $\tan\theta_2 = n2/m2$, and $\tan\theta_3 = n3/m3$ while satisfying Equations (Eq1) and (Eq2):

$$\frac{m1}{L1} - \frac{m2}{L2} = \frac{n3}{L3}; \quad \text{(Eq1)}$$

and $$-\frac{n1}{L1} + \frac{n2}{L2} = \frac{m3}{L3}; \quad \text{(Eq2)}$$

where L1, L2 and L3 are integers indicating side lengths of the first through third square areas, respectively, the first through third square areas including ($m1^2+n1^2$) pieces of halftone dots, ($m2^2+n2^2$) pieces of halftone dots, and ($m3^2+n3^2$) pieces of halftone dots, respectively; (d) coordinate signal generation means for generating a coordinate signal representing a position in a Cartesian U-V coordinate system, the U and V denoting a primary scanning direction and a secondary scanning direction on the mount, respectively; (e) address generation means for transforming the coordinate signal from the U-V coordinates into the X-Y coordinates to generate an address for the screen pattern memory; (f) comparator means for comparing each of the first through third color separation image signals with a threshold value read out from each of the first through third sets of threshold values as a function of the address, to thereby generate first through third exposure signals for the respective first through third colors; and (g) exposure means for exposing the photosensitive material mounted on the mount as a function of each of the first through third exposure signals, thereby recording the first through third halftone images.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a table of Examples each including a set of parameters for three halftone images to restrain second moire according to the present invention;

DESCRIPTION OF THE PREFERRED EMBODIMENT

A. Principles of Moire Control

Generation of moire and the principles of moire control according to the present invention will be first explained below for halftone images formed with a single screen for simplification. In the halftone images formed with a cut-line screen, the density of the image is reproduced by the width of parallel lines, but not by the size of halftone dots as is the case with more popular screens, such as a square-dot screen.

Figure 1A:
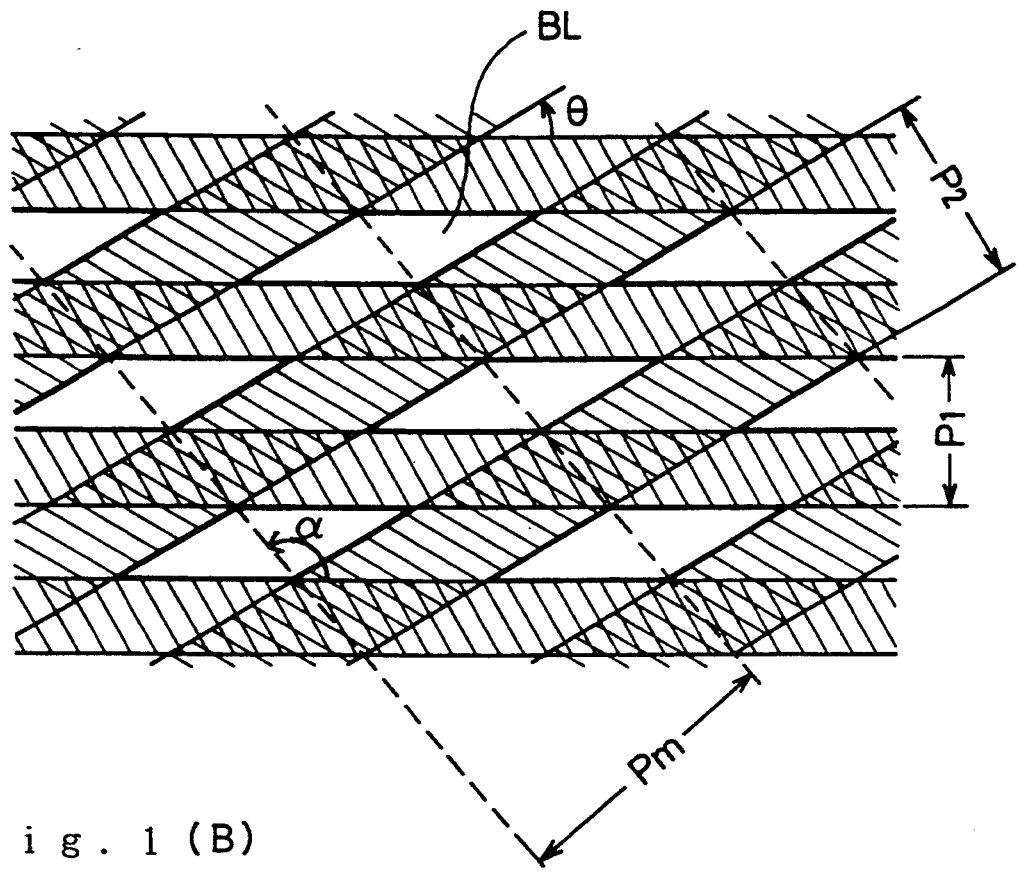
FIGS. 1(A) and 1(B) are plan views showing two groups of parallel lines constituting two cut-line screens that cross over each other.
Figure 1B:
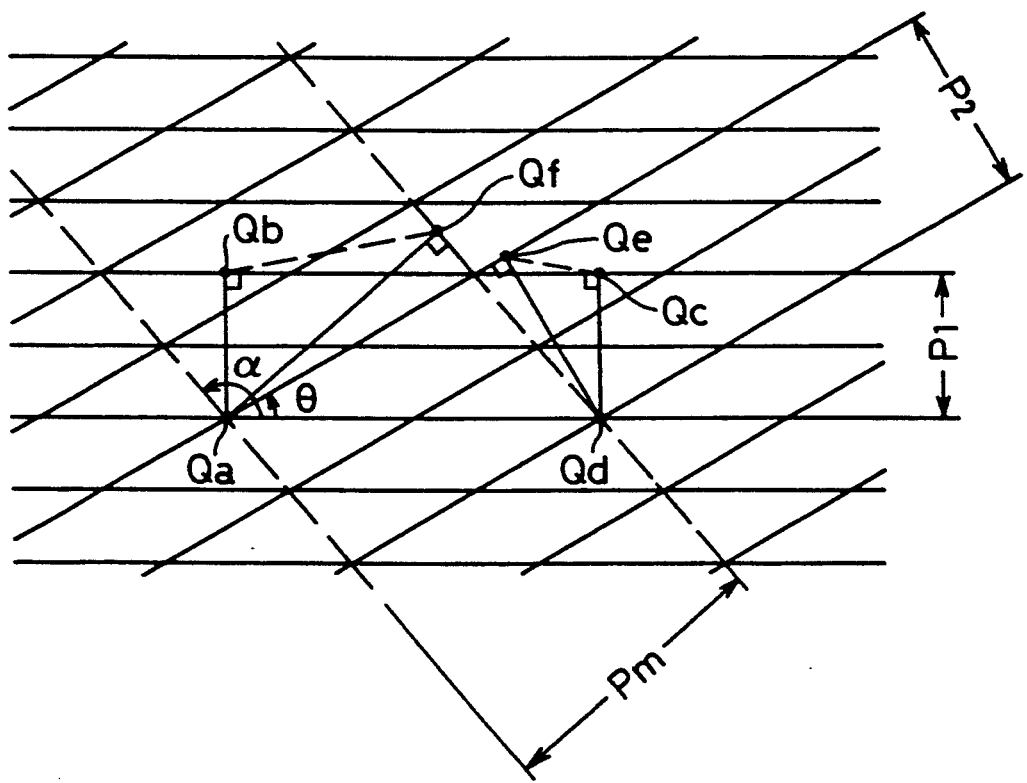

FIGS. 1(A) and 1(B) are enlarged plan views showing two groups of parallel lines which are respectively formed with two cut-line screens. The two sets of parallel lines are crossing at an angle $\theta$. In FIG. 1(A), the shaded areas indicate black areas to be filled with black ink, and rhombus areas BL show blank areas not to be filled with any ink. Alternatively, the shaded areas can be filled with a color other than black, and the two groups of parallel lines may represent different color areas. The blank areas BL are arranged on imaginary parallel lines of a pitch Pm, which are drawn with broken lines. If the image is observed with naked eyes, or if you look at FIG. 1(A) at a considerable distance, a striped pattern of dark and light colors will be seen with the pitch Pm. This striped pattern is a kind of moire which is generated when two halftone images are printed one over the other, and it is called primary moire.

FIG. 1(B) is a figure where the shading in FIG. 1(A) are omitted. Two triangles QaQbQf and QeQcQd are similar to each other. The pitch Pm of the primary moire is given by the following Equations (1) through (6):

$$\frac{QaQf}{QaQb} = \frac{QeQd}{QeQc} \qquad (1)$$

$$QaQf = Pm \qquad (2)$$

$$QaQb = P1 \qquad (3)$$

$$QeQd = P2 \qquad (4)$$

$$QeQc = \sqrt{P1^2 + P2^2 - 2P1P2\cos\theta} \qquad (5)$$

$$Pm = \frac{P1 \cdot P2}{\sqrt{P1^2 + P2^2 - 2P1P2\cos\theta}} \qquad (6)$$

where P1 and P2 denote pitches of the first and second parallel line groups, respectively, and $\theta$ denotes an angle formed by the first and second parallel line groups.

The primary moire angle $\alpha$ (the value measured counterclockwise from the direction in which the first parallel line runs) is given by:

$$\alpha = 90° + \cos^{-1}\left(\frac{Pm\sin\theta}{P2}\right) \qquad (7)$$

Equation (7) is true if $P1 \cdot \cos\theta \leq P2$, and the following Equation (8) is true if $P1 \cdot \cos\theta > P2$.

$$\alpha = 90° - \cos^{-1}\left(\frac{Pm\sin\theta}{P2}\right) \qquad (8)$$

When a third group of parallel lines are further printed over, there is a possibility that a secondary moire may be caused because of interference between the primary moire and the third parallel line group. However, if the pitch and angle of the third parallel line group satisfy the above-described Equations (6) and (7) or Equations (6) and (8), the secondary moire will not be generated; strictly speaking, the cycle of the secondary moire becomes infinite and thus the stripes of deep and light colors cannot be produced on a limited size of paper.

When pitch P3 of the third parallel line group is set equal to the pitch Pm of the primary moire, Equations (6) and (7) are rewritten to Equations (9) and (10) below using line densities V1, V2 and V3 which are the inverses of pitches P1, P2 and P3 of the first through the third parallel line, respectively:

$$V3 = \sqrt{V1^2 + V2^2 - 2V1V2\cos\theta} \tag{9}$$

$$\alpha = 90° + \cos^{-1}\left(\frac{V2\sin\theta}{V3}\right) \tag{10}$$

The line density is defined to be the number of lines per unit length. Vectors V1, V2, and V3 of the line densities V1, V2, and V3, which indicate the directions and dimensions of the line densities V1, V2 and V3, can be defined to have lengths equal to the line densities V1, V2 and V3 and to have directions vertical to the three groups of parallel lines, respectively.

Equations (9) and (10) are equivalent to the following Equations (11) for the line-density vectors V1, V2, and V3:

$$V1 + V2 = V3 \tag{11}$$

Figure 2:
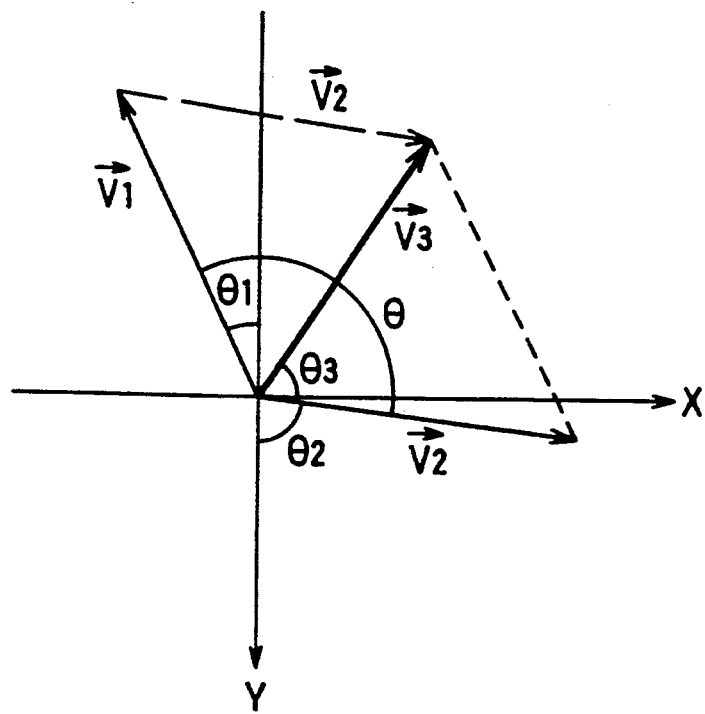
FIG. 2 is a graph showing the relations between line-density vectors of the three groups of parallel lines to restrain moire.

The generation of the secondary moire can be restrained by satisfying Equations (9) and (10) or Equation (11). According to Equation (11), the line density vector V3 of the third parallel line group is equal to the composite vector of the line density vectors V1 and V2 of the first and the second parallel line groups, as shown in FIG. 2.

B. Secondary Moire Prevention Method on an Orthogonal Screen

The above method of restraining secondary moire is applicable to orthogonal halftone screens, such as a square-dot screen and a chain-dot screen. First described here are the relation between the halftone dot arrangement on an orthogonal halftone screen and screen pattern data in the Rational Tangent Method. Screen pattern data is an array of threshold values which are to be compared with an image signal in recording a halftone image by a recording scanner.

Figure 3A:
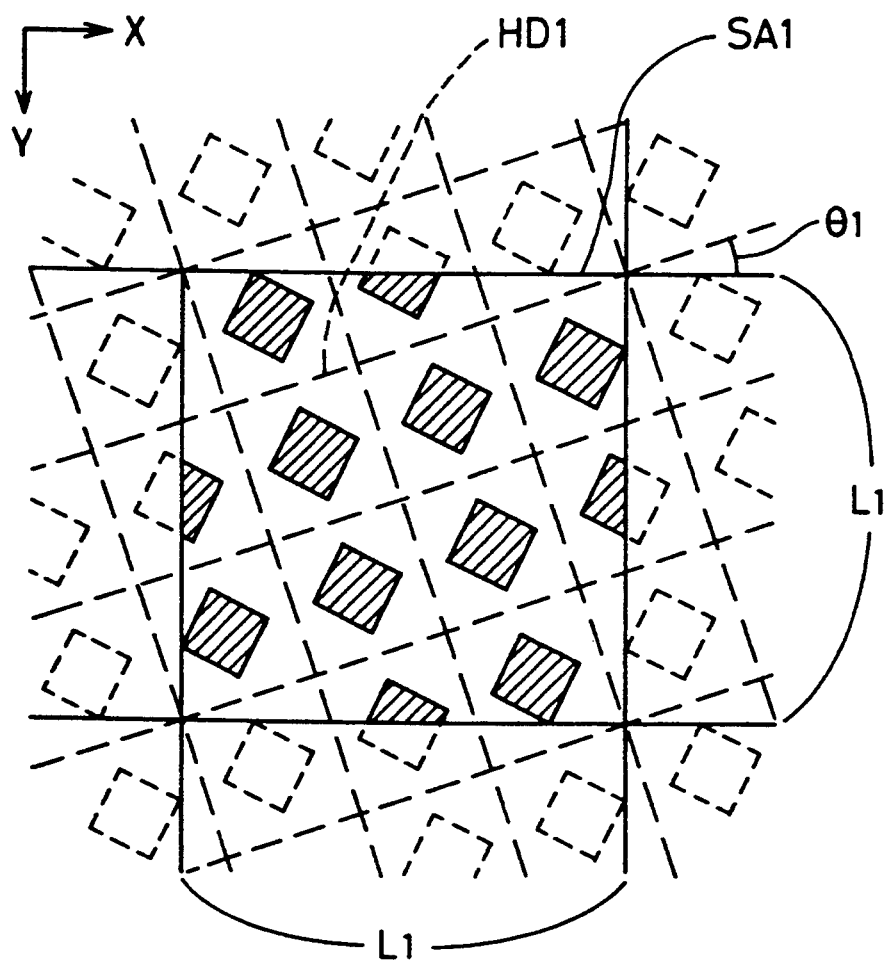
FIGS. 3(A) and 3(B) show an example of halftone dot arrangement by the Rational Tangent Method.

FIG. 3(A) illustrates an example of a halftone dot arrangement by the Rational Tangent Method. X in the FIG. 3(A) indicates the sub-scanning direction and Y indicates the main scanning direction. In FIG. 3(A), a large square SA1 drawn with a solid line is a repetitional area for screen pattern data (hereinafter referred to as "square area"), and a small square HD1 drawn with broken lines is a halftone dot area in which one halftone dot is to be formed. Screen angle $\theta1$ makes $\tan\theta1 = \frac{1}{3}$ in the example of FIG. 3(A).

Figure 3B:
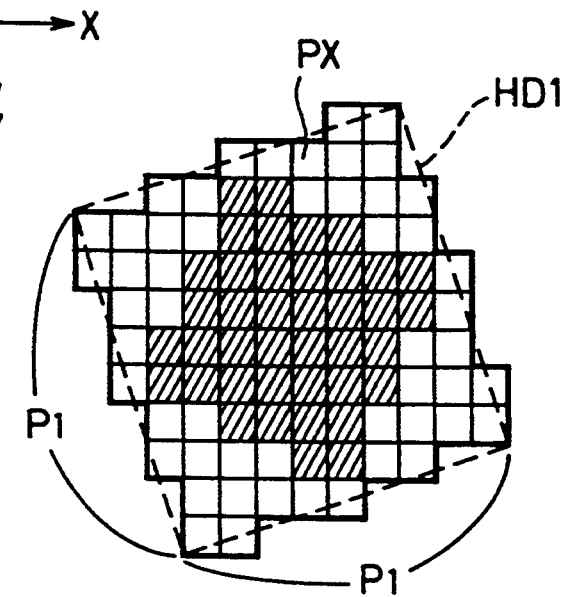

FIG. 3(B) shows a configuration of pixels in one halftone dot area HD1. Each halftone dot area HD1 consists of a plurality of pixels PX, and a value of the screen pattern data is assigned to each pixel PX. An exposure light beam is on-off controlled with respect to each pixel PX in a recording scanner, and the pixels are arranged along the main scanning direction Y and the sub-scanning direction X in the recording.

A length L1 of each side of the square area SA1 in FIG. 3(A) is expressed by an integral number of pixels, and the number of pixel s within one square area SA1 is equal to (L1×L1). The square area SA1 is repeatedly laid on all over the image plane, and every square area SA1 is assigned with the same set of screen pattern data to form the regular two-dimensional arrangement of halftone dots as shown in FIG. 3(A) .

In recording a halftone image, the screen pattern data is read out of a memory with respect to each pixel PX along the main scanning direction Y. An image signal is compared with the screen pattern data to thereby generate an on-off signal, or a halftone dot signal, with respect to each pixel. In the Rational Tangent Method, an address coordinate for the screen pattern data corresponds the main scanning coordinate Y. Since every square area SA1 is assigned with the same set of screen pattern data, the halftone image on the image plane can be recorded with only one set of the screen pattern data for a single square area SA1. A plurality of halftone images having different screen angles are recorded with a plural set of screen pattern data for respective screen angles.

In the Rational Tangent Method, screen angles $\theta1$, $\theta2$ and $\theta3$ of first through third halftone images are determined to satisfy the following Equations (12a) through (12c), respectively:

$$\tan\theta1 = \frac{n1}{m1} \tag{12a}$$

$$\tan\theta2 = \frac{n2}{m2} \tag{12b}$$

$$\tan\theta3 = \frac{n3}{m3} \tag{12c}$$

where m1, n1, m2, n2, m3 and n3 are integers.

In order to prevent the secondary moire in the Rational Tangent Method, Equations (9), (10), and (12a) through (12c) or Equations (11) and (12a) through (12c) are to be satisfied.

FIGS. 4(A) through 4(C) illustrate square areas SA1, SA2 and SA3 for first through the third halftone images.

The square area SA1 shown in FIG. 4(A) includes four congruent right-angled triangles. In the triangle, the two sides containing the right angle are a multiple of m1 and n1, respectively, of the halftone dot pitch P1, or the side length of the halftone dot area HD1. In other words, the two sides of the triangle have the lengths of n1·P1 and m1·P1, respectively, as shown in FIG. 4(A) .

The two sides of a right-angled triangle have the lengths of n2·P2 and m2·P2, respectively, in FIG. 4(B); and n3·P3 and m3·P3 in FIG. 4(C) . The boundaries of the halftone dot areas within the square areas SA1, SA2, and SA3 in FIGS. 4(A) through 4(C) have been omitted for convenience of illustration.

The relation between the side lengths P1, P2, and P3 of the halftone dot areas HD1, HD2, and HD3 and the side length L1, L2, and L3 of the square areas SA1, SA2, and SA3 are given by:

$$P1 = \frac{L1}{\sqrt{m1^2 + n1^2}} \tag{13a}$$

$$P2 = \frac{L2}{\sqrt{m2^2 + n2^2}} \tag{13b}$$

$$P3 = \frac{L3}{\sqrt{m3^2 + n3^2}} \tag{13c}$$

where $(m1^2+n1^2)$, $(m2^2+n2^2)$, and $(m3^2+n3^2)$ indicate the number of halftone dots included in the square areas SA1, SA2, and SA3, respectively.

The following Equations (14a) through (14f) also hold in the Rational Tangent Method:

$$\sin\theta 1 = \frac{n1}{\sqrt{m1^2 + n1^2}} \tag{14a}$$

$$\sin\theta 2 = \frac{n2}{\sqrt{m2^2 + n2^2}} \tag{14b}$$

$$\sin\theta 3 = \frac{n3}{\sqrt{m3^2 + n3^2}} \tag{14c}$$

$$\cos\theta 1 = \frac{m1}{\sqrt{m1^2 + n1^2}} \tag{14d}$$

$$\cos\theta 2 = \frac{m2}{\sqrt{m2^2 + n2^2}} \tag{14e}$$

$$\cos\theta 3 = \frac{m3}{\sqrt{m3^2 + n3^2}} \tag{14f}$$

The following Equations (15a) and (15b) are derived from Equation (11), regarding X components V1x, V2x and V3x, and Y components V1y, V2y and V3y of vectors V1, V2 and V3:

$$V1x + V2x = V3x \tag{15a}$$

$$V1y + V2y = V3y \tag{15b}$$

Figure 4:
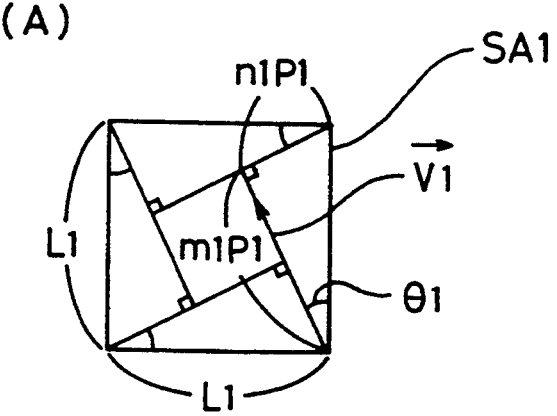
FIGS. 4(A), 4(B), and 4(C) show square areas in the first through the third halftone images.
Figure 4:
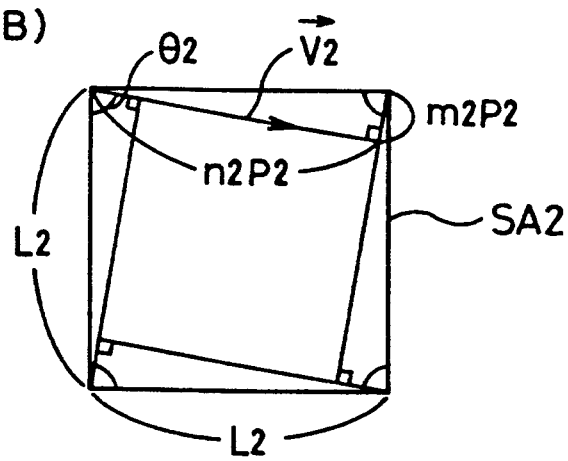
Figure 4:
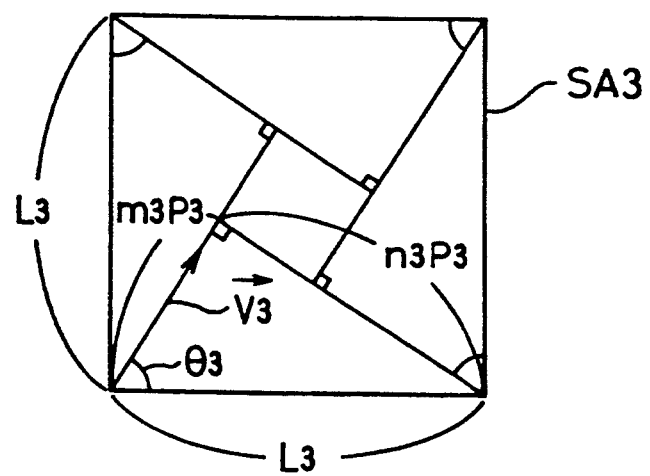

The directions of the vectors V1, V2 and V3 of FIG. 2 are shown in FIGS. 4(A), 4(B) and 4(C), respectively. The following Equations (16a) through 16(f) are derived by using the relations V1=1/P1, V2=1/P2 and V3=1/P3, the definitions of the vector angles $\theta 1$, $\theta 2$ and $\theta 3$ in FIG. 2, and values of trigonometric functions for the angles $\theta 1$, $\theta 2$ and $\theta 3$ shown in FIG. 4:

$$V1x = -V1\sin\theta 1 \tag{16a}$$
$$= -\frac{1}{P1} \cdot \frac{n1}{\sqrt{m1^2 + n1^2}} = -\frac{\sqrt{m1^2 + n1^2}}{L1} \cdot \frac{n1}{\sqrt{m1^2 + n1^2}}$$
$$= -\frac{n1}{L1}$$

$$V2x = V2\sin\theta 2 = \frac{n2}{L2} \tag{16b}$$

$$V3x = V3\cos\theta 3 = \frac{m3}{L3} \tag{16c}$$

$$V1y = -V1\cos\theta 1 = -\frac{m1}{L1} \tag{16d}$$

$$V2y = V2\cos\theta 2 = \frac{m2}{L2} \tag{16e}$$

$$V3y = -V3\sin\theta 3 = -\frac{n3}{L3} \tag{16f}$$

Substituting Equations (16a) through (16f) into Equations (15a) and (15b) gives the following Equations (17a) and (17b):

$$-\frac{n1}{L1} + \frac{n2}{L2} = \frac{m3}{L3} \tag{17a}$$

$$\frac{m1}{L1} - \frac{m2}{L2} = \frac{n3}{L3} \tag{17b}$$

Since Equations (17a) and (17b) are transformed from Equations (15a) and (15a), and further from Equation (11), the secondary moire can be prevented if Equations (12a) through (12c), (17a), and (17b) are satisfied. It should be noted here that all of the variables m1, m2, m3, n1, n2, n3, L1, L2, and L3 in Equations (12a) through (12c), (17a), and (17b) are integers. In determining the values of the variables, the values of the integers m1, n1 and L1 which concern the first halftone image and the values of the integers m2, n2 and L2 which concern the second halftone image are determined first, and then the values of integers m3, n3 and L3 which concern the third halftone image are decided by utilizing Equations (17a) and (17b).

Actually, the following equation (18) indicating the ratio of the integers n3 and m3 is given by dividing respective sides of Equation (17b) by Equation (17a):

$$\frac{\left(\frac{m1}{L1} - \frac{m2}{L2}\right)}{\left(-\frac{n1}{L1} + \frac{n2}{L2}\right)} = \frac{\left(\frac{n3}{L3}\right)}{\left(\frac{m3}{L3}\right)} = \frac{n3}{m3} \tag{18}$$

Since m1, n1, L1, m2, n2 and L2 in Equation (18) are integers, the value of the right-hand side (n3/m3) is always a rational number. Therefore, there always exist the integers m3 and n3 which satisfy Equation (18). In other words, Equation (18) indicates that the integers m3 and n3 for defining the screen angle $\theta 3$ of the third halftone image are always obtainable from the values of the integers m1, n1, L1, m2, n2 and L2 which concern the first and the second halftone images. The side length L3 of the square area SA3 for the third halftone image is obtained by substituting Equations (17a) and (17b) with the candidate values of the integers m3 and n3 according to Equation (18) and by searching for the values of the integers m3 and n3 which make the value of L1 an integer. When a set of integers m3, n3 and L3 which satisfy Equations (17a) and (17b) are obtained, K·m3, K·n3 and K·L3 also satisfy Equations (12a) through (12c), (17a), and (17b), where K is an arbitrary integer. However, the most favorable values as the integers m3, n3 and L3 are those which include the minimum value of the integer L3; in other words, the most favorable values are those the greatest common divisor of which is one. Since the integer L3 is the side length the square area SA1, or the pitch of square area SA1, a smaller value of the integer L3 is preferable because it needs a smaller memory capacity for storing screen pattern data.

Figure 6:
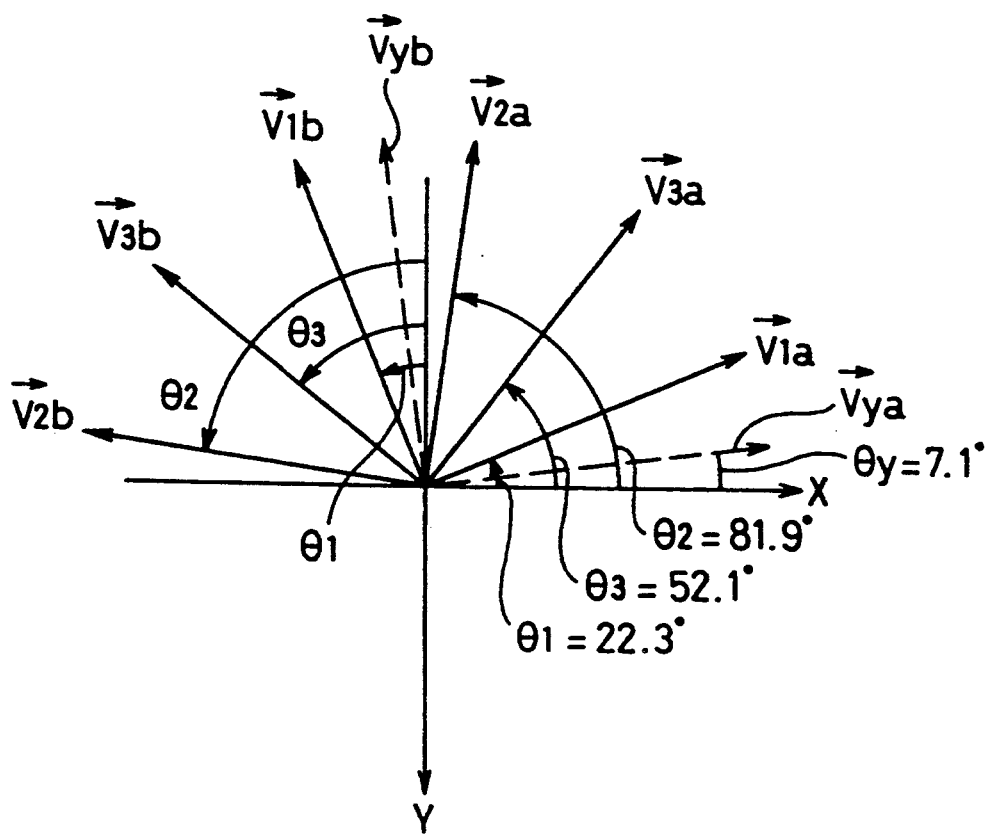
FIG. 6 is a graph showing the line-density vectors corresponding to the three halftone images in the seventh embodiment.

FIG. 6 shows several sets of values which satisfy Equations (12a) through (12c), (17a), and (17b).

It is favorable that the differences in the screen angles of the three halftone image are respectively set to approximately 30° to prevent the secondary moire. The examples shown in FIG. 5 are selected so that the difference between the first and the third screen angles ($\theta 3 - \theta 1$) is about 30 degrees, that the difference ($\theta 2 - \theta 3$) is about 30 degrees too, and that the difference ($\theta 1 - \theta 2$) is about 60 degrees.

In general, a finer halftone dot pitch is more favorable because it enables a smoother image expression, but it is technically difficult to stably print small halftone dots. Thus a halftone dot pitch is decided as a compromise point of the image quality demand and printing technology. Therefore, if there exist a plural sets of three halftone dot pitches P1, P2 and P3 to restrain the second moire, it is favorable that the three halftone dot pitches are as close to each other as possible; it is especially favorable that the difference in pitch is no greater than about 15%. Example 7 in FIG. 5 shows the differences between halftone dot pitches P1, P2 and P3 less than 1%, and it is the most favorable in FIG. 5.

FIG. 6 is a graph to show the line density vectors V1a, V2a and V3a for the three halftone images for Example 7. In FIG. 6, the screen angle is defined as an angle measured counterclockwise from the sub-scanning direction X to the vectors V1a, V2a and V3a. On an orthogonal screen, vectors V1b, V2b and V3b, whose direction are 90° different from those of the vectors V1a, V2a and V3a, also indicate the same screen structures. Since Y (yellow) plate is weakly related to moire generation, an arbitrary angle can be selected as a screen angle of Y plate. The screen angle of Y plate is usually set to be about an average of screen angles of two plates selected from M plate, C plate and K plate. For Examples 1 through 7 shown in FIG. 5, it is practically favorable to use the screen angle $\theta y$ of Y plate that gives $\tan\theta y = \frac{1}{8}$ or 1/7. Vectors Vya and Vyb shown in FIG. 6 are line density vectors of Y plate in the case that $\tan \theta y = \frac{1}{8}$.

In Example 4 of FIG. 5, the screen angle $\theta 3$ for the third screen plate is 45°. Although this is acceptable to restrain the secondary moire, it is favorable not to set a screen angle at 0° or 45° because of the reason described below.

Figure 7A:
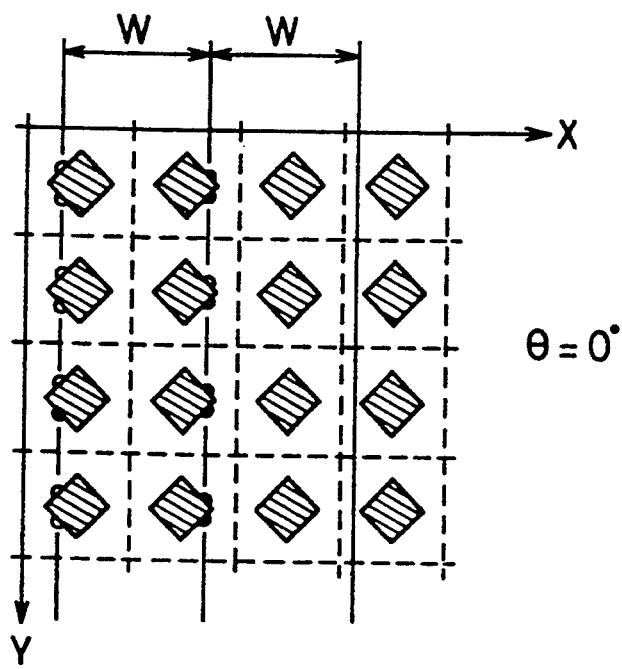
FIGS. 7(A) and 7(B) show the halftone dot arrangement where screen angles $\theta$ are 0° and 45°.
Figure 7B:
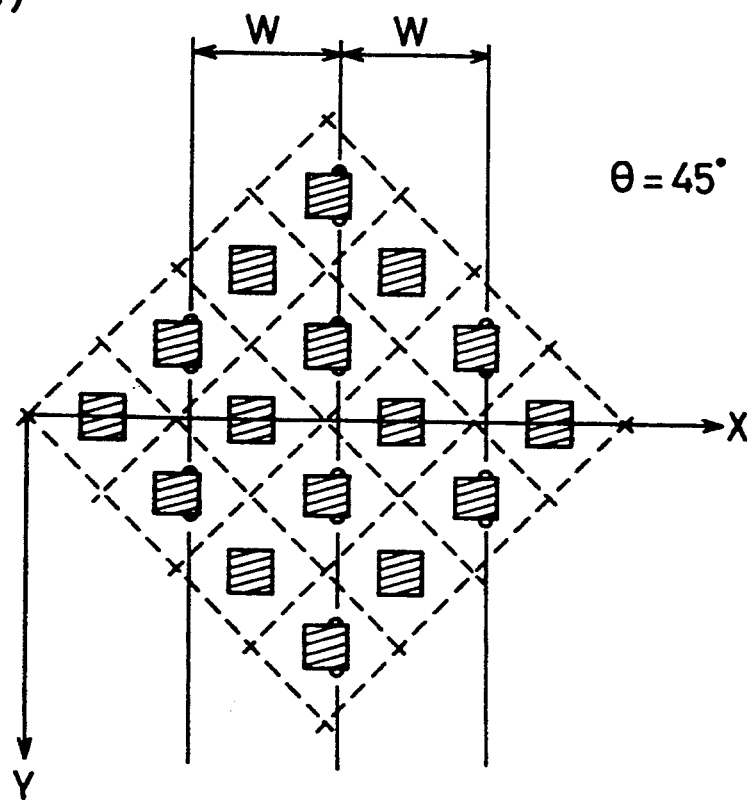

FIGS. 7(A) and 7(B) illustrates halftone dot arrangements when their screen angle $\theta$ is 0° and 45°. The halftone dots shown in FIG. 7 are recorded by exposing a photosensitive film with a plurality of light beams, where luminous flux of one light beam is larger than those of the other light beams. The pixel exposed by the light beam of the larger luminous flux forms a blackened part larger than the pixels exposed by the other light beams. Suppose that an area of width W is simultaneously exposed, the larger blackened areas appear cyclically with an interval of the width W. The images in FIGS. 7(A) and 7(B) look like black lines having an interval W when observed with naked eyes. When a screen angle is 0° or 45°, black or white lines extending in the main scanning direction Y are cyclically observed in the above manner because the halftone dots are arranged in the main scanning direction Y if there is an unevenness in the luminous fluxes of or the intervals of the light beams. Since such black or white lines do not originally exist in the image, they degrade the image quality. On the contrary, if the screen angle is not 0° or 45°, such black or white lines are not clear to the human eyes because the halftone dots are not arranged in the main scanning direction Y; thus the image quality degradation is small.

A screen angle is prevented from being 0° by setting integers n1, n2 and n3 at non-zero values, and a screen angle is prevented from being 45° by setting n1≠m1, n2≠m2 and n3≠m3.

In the embodiments described above, the screen angle is defined as the value measured counterclockwise from the sub-scanning direction X, but the same result as above can be obtained even if another definition is used for the screen angle; for example, it can be measured clockwise from the main scanning direction Y. The secondary moire can be restrained in the same way as described above even if the integers m1 to m3 are exchanged with the integers n1 to n3, respectively, in the Examples shown in FIG. 5.

Figure 8:
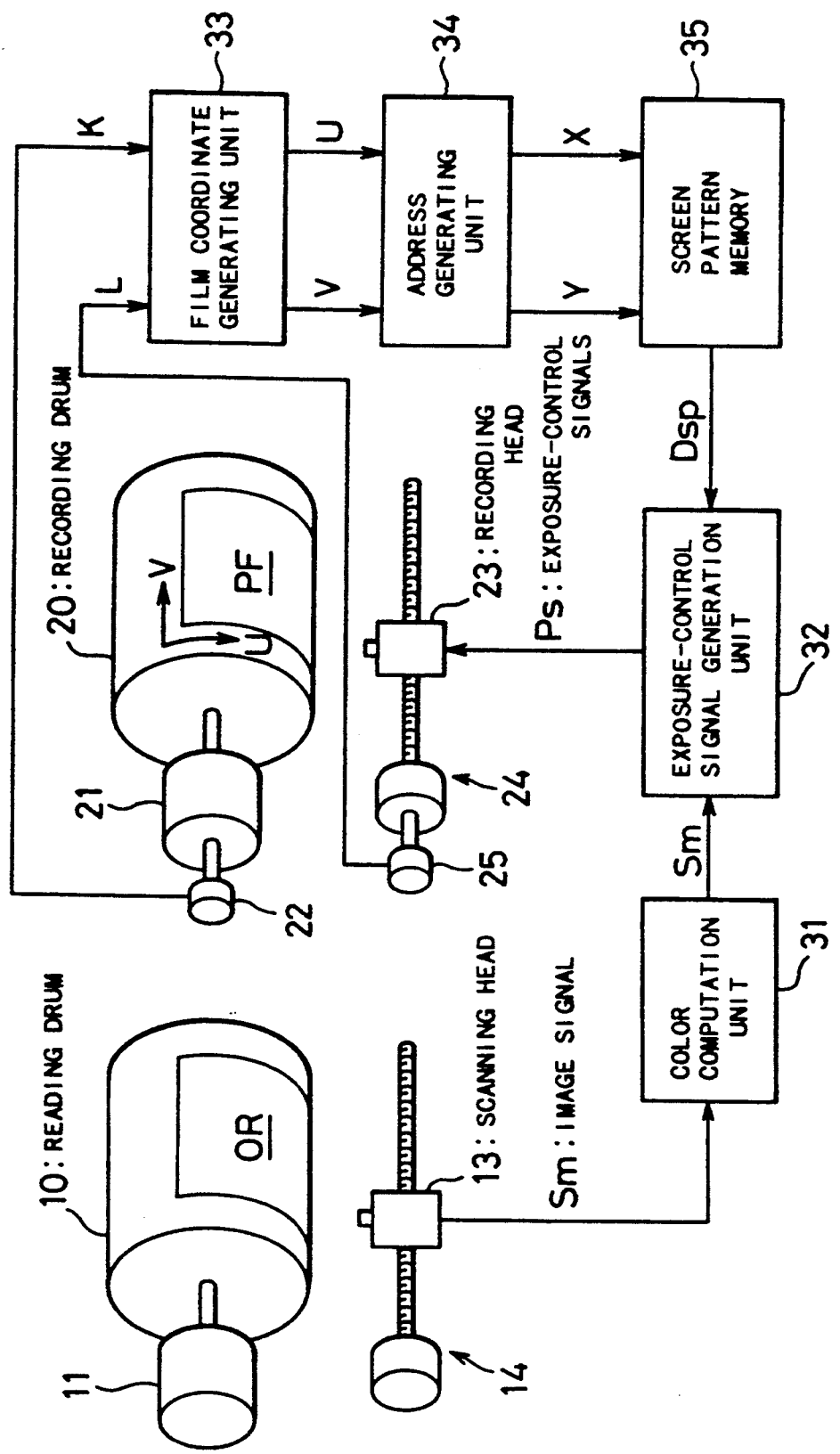
FIG. 8 is a schematic view illustrating the structure of an image recording apparatus.

FIG. 8 is a schematic view illustrating the structure of an image recording apparatus for recording a halftone image according to the halftone dot generation method of the first embodiment. The image recording apparatus comprises a reading drum 10, on which an original OR is held; and a recording drum 20, on which a photosensitive film PF is held.

The reading drum 10 is driven by a driving motor 11 to rotate around the central axis thereof at a predetermined rotational speed, and simultaneously a scanning head 13 is driven by a shuttle mechanism 14 with a ball thread to move along the central axis at a constant speed. The scanning head 13 scans the image of the original OR along the scanning lines and generates an image signal Sm. The image signal Sm is sent to a color computation unit 31 for executing color correction or tone correction and then supplied to an exposure-control signal generation unit 32.

The recording drum 20 is driven by a driving motor 21 to rotate around the central axis thereof at a predetermined rotational speed, and simultaneously a recording head 23 is driven by a shuttle mechanism 24 with a ball thread to move along the central axis at a constant speed. A rotary encoder 22 rotating with the recording drum 20 generates a position signal K in a primary scanning direction, whereas another rotary encoder 25 rotating with the rotation of a motor of the shuttle mechanism 24 generates another position signal L in a secondary scanning direction.

A film coordinate generating unit 33 converts the position signals K, L to coordinates (U, V) in the scanning coordinate system on the photosensitive film PF. The scanning coordinates (U, V) are then converted by an address generating unit 34 into an address (X, Y) of a screen pattern memory 35.

The screen pattern memory 35 stores screen pattern data for respective four primary colors of YMCK. Suppose that the square areas SA1, SA2, and SA3 shown in FIGS. 4(A), 4(B), and 4(C) are used for magenta, cyan, and black, respectively, the screen pattern data Dsp for these colors are arranged in the respective square areas SA1, SA2, and SA3. The square area SA1 includes L1×L1 pixels, and the screen pattern data for magenta are repeatedly applied to every L1×L1 pixel area, or every square area SA1, replicated over an image plane. The screen pattern memory 34 therefore needs to store only one set of the screen pattern data arranged within one square area SA1 for magenta. This is also the case with the screen pattern data for cyan and black.

Figure 9:
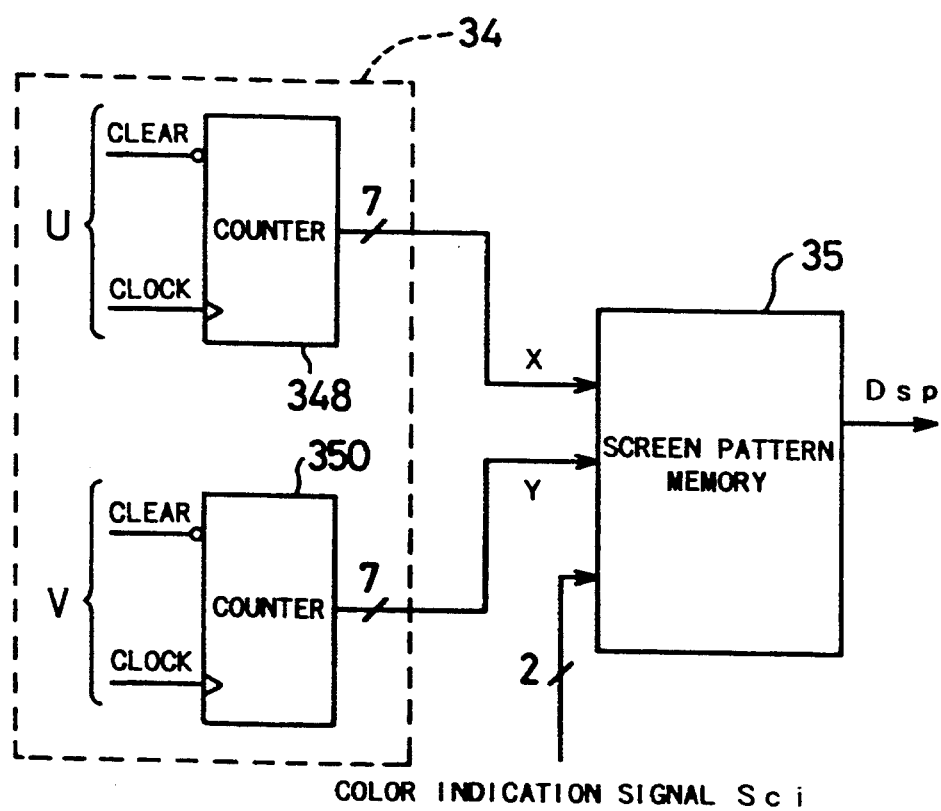
FIG. 9 is a block diagram showing the internal structure of an address generating unit.

FIG. 9 is a block diagram showing the internal structure of the address generating unit 34 and the screen pattern memory 35. The address generating unit 34 includes two binary counters 348 and 350. The two binary counters 348 and 350 respectively count clock signals U and V, or scanning coordinate signals, to output the count values as address (X, Y) of the screen pattern memory 35, and reset the count value when the count value reaches the side length of the square area for the color. In other words, the address coordinates (X, Y) are on the same axes as those of the scanning coordinates (U, V), but the former is reset at every count of the counters 348 and 350 which is equal to the side length of the square area for the color. Since the side lengths L1, L2, and L3 of the square areas SA1, SA2, and SA3 are different from each other, the address generating unit 34 is provided for every color.

The screen pattern memory 35 receives the address (X, Y) as well as a color indication signal Sci indicating one of the four primary colors. The color indication signal Sci is supplied from the film coordinate generating unit 33. Since the screen pattern memory 35 stores the screen pattern data prepared for each color, the screen pattern data for the color under recording is read out of the screen pattern memory 35 responsive to the color indication signal Sci.

The screen pattern data Dsp read from the screen pattern memory 35 is supplied to the exposure-control signal generation unit 32.

The exposure-control signal generation unit 32 compares the image signal Sm with the screen pattern data Dsp, and generates an exposure-control signal Ps indicating whether each recording pixel is to be exposed or not; a recording pixel is exposed when Dsp<Sm, and not exposed when DSp≧Sm. The recording head 23 on-off controls a laser beam in response to the exposure-control signal Ps to record halftone images on the photosensitive film PF.

The halftone images thus produced restrain the second moire from appearing on a printed image.

As described above, the present invention restrains the secondary moire even for the halftone dot arrangement according to the Rational Tangent Method. Since there are a number of sets of integers m1, n1, L1, m2, n2, L2, m3, n3 and L3 available according to the present invention, the present invention provides a great deal of flexibility in selecting one of the plural sets of integers.

If it is satisfied that any one of n1, n2 and n3 is an integer other than zero and that m1≠n1, m2≠n2 and m3≠n3, image quality degradation caused by unevenness in the luminous fluxes of or the intervals of a plurality of light beams used in image recording.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of forming a plurality of halftone images to be used in reproducing a color image, comprising the steps of:

determining screen angles $\theta_1$, $\theta_2$ and $\theta_3$ of first through third halftone images, respectively, by setting values of integers m1, n1, m2, n2, m3 and n3 defining relations of $\tan\theta_1 = n1/m1$, $\tan\theta_2 = n2/m2$, and $\tan\theta_3 = n3/m3$ while satisfying Equations (Eq1) and (Eq2):

$$\frac{m1}{L1} - \frac{m2}{L2} = \frac{n3}{L3} ; \quad (Eq1)$$

and $$-\frac{n1}{L1} + \frac{n2}{L2} = \frac{m3}{L3} ; \quad (Eq2)$$

where L1, L2 and L3 are integers indicating side lengths of first through third square areas for said first through the third halftone images, respectively, said first through third square areas including $(m1^2+n1^2)$ pieces of halftone dots, $(m2^2+n2^2)$ pieces of halftone dots, and $(m3^2+n3^2)$ pieces of halftone dots, respectively;

preparing first through third sets of threshold values for said first through third halftone images, respectively, said first through third sets of threshold values being assigned to pixels within each first through third square areas, respectively, said first through third square areas being laid out repeatedly on respective image planes corresponding to said respective first through third halftone images;

comparing first through third color separation image signals representing a color image with said first through third sets of threshold values, respectively, to thereby produce first through third halftone image signals; and forming said first through third halftone images as a function of said first through third halftone image signals, respectively.

2. A method in accordance with claim 1, wherein each of said integers n1, n2 and n3 is not equal to zero, said integers satisfies that m1≠n1, m2≠n2, and m3≠n3.

3. A method in accordance with claim 1, wherein said first halftone images are those for magenta, cyan, and black inks, respectively.

4. A method in accordance with claim 1, further comprising the steps of:

preparing first through third sets of threshold values for said first through third halftone images, respectively, said first through third sets of threshold values being assigned to pixels within said first through third square areas, respectively, said first through third square areas being laid out repeatedly on respective image planes corresponding to said respective first through third halftone images;

comparing first through third color separation image signals representing a color image with said first through third sets of threshold values, respectively, to thereby produce first through third exposure signals; and forming said first through third halftone images as a function of said first through third exposure signals, respectively.

5. An apparatus of forming a plurality of halftone images to be used in reproducing a color image, comprising:

(a) image capturing means for capturing first through third color separation image signals representing a color image for first through third colors, respectively;

(b) a mount for mounting photosensitive material, on which first through third halftone images are to be recorded, said first through third halftone images being to be recorded from said first through third color separation image signals, respectively;

(c) a screen pattern memory for storing three sets of threshold values for said respective first through third colors, said three sets of threshold values being arranged in first through third square areas, respectively, each of said first through third square areas being laid out repeatedly in an X-Y coordinate system, each of said first through third square areas being defined by:

(c-1) determining screen angles $\theta_1$, $\theta_2$ and $\theta_3$ of said first through third halftone images, respectively, by setting values of integers m1, n1, m2, n2, m3 and n3 defining relations of $\tan\theta_1 = n1/m1$, $\tan\theta_2 = n2/m2$, and $\tan\theta_3 = n3/m3$ while satisfying Equations (Eq1) and (Eq2):

$$\frac{m1}{L1} - \frac{m2}{L2} = \frac{n3}{L3} ; \quad (Eq1)$$

and

-continued $$-\frac{n1}{L1} + \frac{n2}{L2} = \frac{m3}{L3};$$ (Eq2)

where L1, L2 and L3 are integers indicating side lengths of said first through third square areas, respectively, said first through third square areas including $(m1^2+n1^2)$ pieces of halftone dots, $(m2^2+n2^2)$ pieces of halftone dots, and $(m3^2+n3^2)$ pieces of halftone dots, respectively;

(d) coordinate signal generation means for generating a coordinate signal representing a position in a Cartesian U-V coordinate system, said U and V denoting a primary scanning direction and a secondary scanning direction on said mount, respectively;

(e) address generation means for transforming said coordinate signal from said U-V coordinates into said X-Y coordinates to generate an address for said screen pattern memory;

(f) comparator means for comparing each of said first through third color separation image signals with a threshold value read out from each of said first through third sets of threshold values as a function of said address, to thereby generate first through third halftone image signals for said respective first through third colors; and (g) exposure means for exposing said photosensitive material mounted on said mount as a function of each of said first through third halftone image signals, thereby recording said first through third halftone images.

6. An apparatus in accordance with claim 5, wherein each of said integers n1, n2 and n3 is not equal to zero, said integers satisfies that $m1 \neq n1$, $m2 \neq n2$, and $m3 \neq n3$.

7. An apparatus in accordance with claim 5, wherein said first halftone images are those for magenta, cyan, and black inks, respectively.

* * * * *